(12) United States Patent
Sands

(10) Patent No.: US 10,998,567 B2
(45) Date of Patent: May 4, 2021

(54) HYBRID FUEL CELL WITH POLYMERIC PROTON EXCHANGE MEMBRANES AND ACIDIC LIQUID ELECTROLYTE

(71) Applicant: Marvick FuelCells Ltd., Windsor (CA)

(72) Inventor: Kenneth Sands, Windsor (CA)

(73) Assignee: Marvick FuelCells Ltd., Windsor (CA)

(*) Notice: Subject to any disclaimer, the term of this patent is extended or adjusted under 35 U.S.C. 154(b) by 140 days.

(21) Appl. No.: 16/484,247

(22) PCT Filed: Jan. 25, 2018

(86) PCT No.: PCT/CA2018/050086
§ 371 (c)(1),
(2) Date: Aug. 7, 2019

(87) PCT Pub. No.: WO2018/145197
PCT Pub. Date: Aug. 16, 2018

(65) Prior Publication Data
US 2020/0006795 A1    Jan. 2, 2020

Related U.S. Application Data

(60) Provisional application No. 62/457,601, filed on Feb. 10, 2017, provisional application No. 62/565,459, filed on Sep. 29, 2017.

(51) Int. Cl.
*H01M 8/1053* (2016.01)
*H01M 8/1023* (2016.01)
(Continued)

(52) U.S. Cl.
CPC ....... *H01M 8/1053* (2013.01); *H01M 8/0258* (2013.01); *H01M 8/086* (2013.01);
(Continued)

(58) Field of Classification Search
CPC . H01M 2008/1095; H01M 2300/0008; H01M 2300/008; H01M 2300/0082;
(Continued)

(56) References Cited

U.S. PATENT DOCUMENTS 3,152,015 A    10/1964  Tirrell
3,357,861 A    12/1967  Hunger
(Continued)

FOREIGN PATENT DOCUMENTS

| CN | 101710620 | 5/2010 |
| EP | 3048188 | 7/2016 |
| JP | 5553699 | 7/2014 |

OTHER PUBLICATIONS

Kraytsberg et al., Review of Advanced Materials for Proton Exchange Membrane Fuel Cell, Energy Fuels, 2014, 28(12) pp. 7303-7330, Oct. 21, 2014.
(Continued)

*Primary Examiner* — Carlos Barcena
(74) *Attorney, Agent, or Firm* — Bereskin & Parr LLP

(57) ABSTRACT

A hybrid fuel cell comprises an anode, a cathode, and a membrane electrode assembly. The membrane electrode assembly comprises a first polymeric proton exchange membrane, a second polymeric proton exchange membrane, and an acidic liquid electrolyte layer disposed between the first and second proton exchange membranes. A method of producing electricity with the fuel cell is also disclosed.

20 Claims, 13 Drawing Sheets

(51) Int. Cl.
H01M 8/086 (2016.01)
H01M 8/1004 (2016.01)
H01M 8/0258 (2016.01)
H01M 8/1018 (2016.01)

(52) U.S. Cl.
CPC ....... *H01M 8/1004* (2013.01); *H01M 8/1023* (2013.01); *H01M 2008/1095* (2013.01); *H01M 2300/0008* (2013.01); *H01M 2300/0082* (2013.01); *H01M 2300/0094* (2013.01)

(58) Field of Classification Search
CPC ....... H01M 2300/0094; H01M 8/0258; H01M 8/086; H01M 8/1004; H01M 8/1016; H01M 8/1018; H01M 8/1023; H01M 8/103; H01M 8/1053
See application file for complete search history.

(56) References Cited

U.S. PATENT DOCUMENTS

| | | |
|---|---|---|
| 7,960,070 B2 | 6/2011 | Uchida et al. |
| 8,557,446 B2 | 10/2013 | Chervakov et al. |
| 2005/0271915 A1 | 12/2005 | Haile et al. |
| 2011/0082222 A1 | 4/2011 | Ziser et al. |
| 2012/0052403 A1 | 3/2012 | Tatematsu |
| 2012/0141910 A1 | 6/2012 | Jia et al. |
| 2012/0321992 A1 | 12/2012 | Choi et al. |
| 2014/0342262 A1 | 11/2014 | Brett et al. |

OTHER PUBLICATIONS

Liang An et al., The dual role of hydrogen peroxide in fuel cells, Science Bulletin, vol. 60, Issue 1, Jan. 2015, pp. 55-64.

International Search Report and Written Opinion of the International Searching Authority of PCT/CA2018/050086, dated Apr. 26, 2018.

Meghan Eleanor Lieb, Toward an Effective Direct Ethanol Fuel Cell Through the Use of Cation Exchanged Nation® Membranes, a dissertation presented to the faculty of Princeton University in candidacy for the degree of doctor of philiosophy, Nov. 2011.

Sossina M. Haile, Fuel Cell Materials and Components, Acta Materialia (2003), 51 (19). pp. 5981-6000. ISSN 1359-6454.

Walt Pyle et al., Making Electricity with Hydrogen, Home Power #35, Jun./Jul. 1993.

Ki-Yun Cho et al., Preparation and charateristics of Nafion membrane coated with a PVdF copolymer/recast Nafion blend for direct methanol fuel cell, Journal of Power Sources, 159 (2006), 524-528.

FuelCells.org, Types of Fuel Cells (2015), online: <http://www.fuelcells.org/base.cgim?template=types_of_fuel_cells>.

HYBRID FUEL CELL WITH POLYMERIC PROTON EXCHANGE MEMBRANES AND ACIDIC LIQUID ELECTROLYTE

BACKGROUND OF THE INVENTION

1. Field of the Invention

The subject invention generally relates to a fuel cell and a method of producing electricity.

2. Description of the Related Art

A fuel cell is an electrochemical cell comprising two electrodes (an anode and a cathode) separated by an electrolyte that generates electricity. In a fuel cell, fuel (e.g. hydrogen, methanol, ethanol, etc.) is supplied to the anode while an oxidant (e.g. pure oxygen or air) is supplied to the cathode. Electrochemical reactions occur at each electrode, and the chemical energy of the fuel is converted into heat, electricity, and water.

There are many different types of fuel cells. Alkaline fuel cells (AFC), proton exchange membrane (PEM) fuel cells, direct methanol fuel cells (DMFC), molten carbonate fuel cells (MCFC), phosphoric acid fuel cells (PAFC), and solid oxide fuel cells (SOFC) are all known in the art and commercially available.

Each fuel cell type has its own unique chemistry, such as different operating temperatures, catalysts, and electrolytes. A fuel cell's chemistry makes it more or less desirable for certain applications. For example, lower temperature proton exchange membrane fuel cells are often used in vehicular applications, e.g. to power passenger vehicles and forklifts, while larger, higher temperature phosphoric acid fuel cells are often used in stationary power generation applications.

In proton exchange membrane fuel cells, an acidic polymer membrane separates the electrodes. The acidic polymer allows the transport of protons (hydrogen ions) between the electrodes, but is not electrically conductive. Examples of commonly used acidic polymer electrolytes include sulfonated tetrafluoroethylene based fluoropolymer-copolymer (e.g. polymer sold by DuPont under the trade name NAFION®) and polybenzimidazoles. Proton exchange membrane fuel cells include a solid polymer membrane, are typically catalyzed by platinum-type catalysts, operate at temperatures from about 79 to about 93° C. with an electrical efficiency of from about 40 to about 60%. To this end, proton exchange membrane fuel cells operate at relatively low temperatures, have high power density, and can vary output quickly to meet shifts in power demand. Proton exchange membranes are fueled with hydrogen gas, methanol, or reformed fuels. As such, proton exchange membrane fuel cells are well-suited to power applications where quick startup is required, such as automobiles or forklifts.

Not all fuel cells employ a polymeric membrane or ionomer promoting the conduction of electrons. Liquid electrolyte systems also exist in the context of both acidic and alkaline fuel cells. Phosphoric acid fuel cells are acidic liquid electrolyte fuel cells. Phosphoric acid fuel cells often utilize liquid phosphoric acid ceramic in a lithium aluminum oxide matrix, a carbon-supported platinum catalyst, and operate at temperatures of from about 177 to about 204° C. with an electrical efficiency of from about 40 to about 60%. PAFCs can operate using reformed hydrocarbon fuels or biogas. The anode and cathode reactions of phosphoric acid fuel cells are similar to proton exchange membranes, but since operating temperatures are higher, phosphoric acid fuel cells are more tolerant of fuel impurities. Phosphoric acid fuel cells are frequently used in a cogeneration mode, in which byproduct heat is captured for onsite heating, cooling, and hot water (also called combined heat and power, or CHP). Phosphoric acid fuel cells are commercially available today with systems operating around the world at high-energy demand sites such as hospitals, schools, office buildings, grocery stores, manufacturing or processing centers, and wastewater treatment plants.

There is a need for fuel cells which provide the advantages of both proton exchange membrane fuel cells and also phosphoric acid fuel cells, which can be effectively utilized in a broad range of applications.

SUMMARY OF THE INVENTION AND ADVANTAGES

The subject invention provides a hybrid fuel cell comprising an anode, a cathode, and a membrane electrode assembly. The membrane electrode assembly comprises a first polymeric proton exchange membrane, a second polymeric proton exchange membrane, and an acidic liquid electrolyte layer disposed between the first and second proton exchange membranes. A method of producing electricity with the fuel cell is also disclosed.

The hybrid fuel cell provides the advantages of both proton exchange membrane fuel cells and also phosphoric acid fuel cells, which can be effectively utilized to generate electricity in a broad range of applications. Further, the fuel cell is resistant to carbon monoxide (CO) poisoning.

BRIEF DESCRIPTION OF THE DRAWINGS

Other advantages of the present invention will be readily appreciated, as the same becomes better understood by reference to the following detailed description when considered in connection with the accompanying drawings wherein:

FIGS. 1-19 are exemplary in nature and are not drawn to scale and are, thus, not intended to represent the relative sizes of the various components of the fuel cell, the membrane electrode assembly, etc.

DETAILED DESCRIPTION OF THE INVENTION

Figure 1:
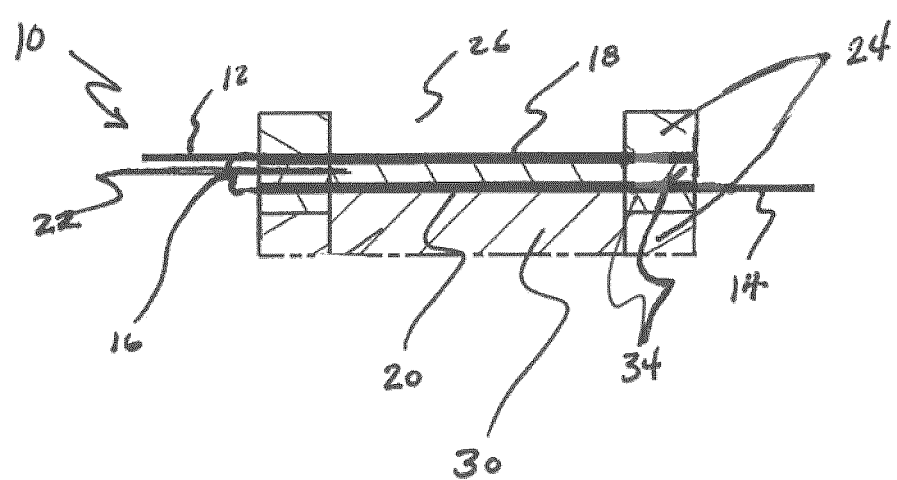
FIG. 1 is a partial, cross-sectional view of a fuel cell according to this invention.

Referring to the FIG. 1, wherein like numerals indicate corresponding parts throughout the several views, a partial view of an embodiment of a hybrid fuel cell ("fuel cell") is generally shown at 10. The fuel cell 10 comprises an anode 12, a cathode 14, and a membrane electrode assembly 16. The membrane electrode assembly 16 comprises a first polymeric proton exchange membrane 18, a second polymeric proton exchange membrane 20, and an acidic liquid electrolyte layer 22 disposed between the first and second proton exchange membranes 18, 20.

Still referring to the fuel cell 10 of FIG. 1, a frame 24 separates the first and second polymeric proton exchange membranes 18, 20 having the acidic liquid electrolyte layer 22 disposed therebetween from an oxidant reservoir 26 and a fuel reservoir 30. The frame 24 and the first polymeric proton exchange membrane 18 define the oxidant reservoir 26 which contains an oxidant 28. The frame 24 and the second polymeric proton exchange membrane 20 define the fuel reservoir 30 which contains a fuel 32. As is shown in the embodiment of FIG. 1, the frame 24 comprises one or more segments. Notably, a seal 34 is included to adequately seal the fuel cell 10. The fuel cell 10 also includes a housing 36, which is not shown in FIG. 1. In the embodiment of FIG. 1, the seal 34 separates the first and second polymeric proton exchange membranes 18, 20 having the acidic liquid electrolyte layer 22 disposed therebetween. In many embodiments, additional seals 34 can be located between the first and second polymeric proton exchange membranes 18, 20 having the acidic liquid electrolyte layer 22 disposed therebetween from an oxidant reservoir 26 and a fuel reservoir 30. That is, additional seals 34 can be placed between the membrane electrode assembly 16 and the frame 24.

The frame 24 which surrounds the membrane electrode assembly 16 and/or the seal 34 comprises a polymer. The polymer is selected from elastomers, thermoplastics, thermoplastic elastomers, and combinations thereof. The polymer can be a thermoplastic polymer or a thermosetting polymer.

In many embodiments, the polymer is a thermoplastic polymer (thermoplastic). The thermoplastic can be an amorphous or crystalline polymer. Generally, crystalline polymers have a relatively sharp melting point, have a more ordered arrangement of molecular chains, and require higher temperatures to flow well when compared to amorphous polymers. Generally, amorphous polymers have no true melting point and soften gradually, have a more random orientation of molecular chains, and do not flow as easily as amorphous polymers. In some embodiments, the thermoplastic composition includes a combination of crystalline and amorphous thermoplastic polymers. In other embodiments, the thermoplastic composition includes thermoplastic elastomers which can include crystalline and amorphous segments.

Figure 16:
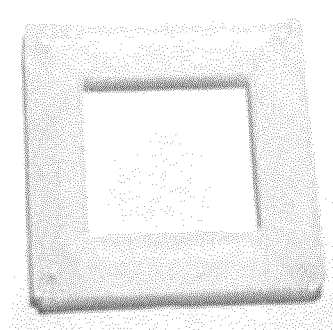
FIG. 16 is an isolated perspective view of a frame segment comprising silicone.
Figure 17:
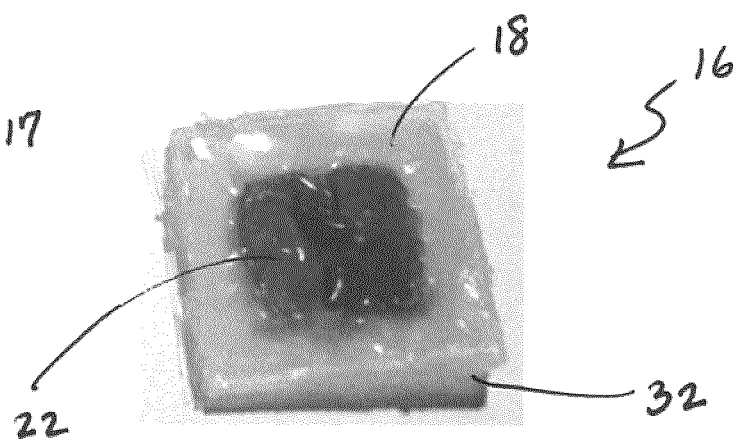
FIG. 17 is an isolated perspective view of a membrane electrode assembly including a frame segment comprising silicone.

Various non-limiting examples of suitable elastomers include natural rubber (natural polyisoprene), synthetic polyisoprene, polybutadiene, chloroprene rubber, butyl rubber, halogenated butyl rubber, styrene-butadiene rubber, nitrile rubber, ethylene propylene rubber, ethylene propylene diene rubber, epichlorohydrin rubber, polyacrylic rubber, silicone rubber, fluorosilicone rubber, fluoroelastomers, perfluoroelastomers, polyether block amides, chlorosulfonated polyethylene, and ethylene-vinyl acetate. In a preferred embodiment, the polymer comprises, consists essentially of, or consists of silicone. For example, a frame 24 comprising silicone is shown in FIG. 16. Embodiments of the fuel cell 10 which include the frame 24 and/or the seal 34 comprising silicone, e.g. comprising a silicone rubber, are resistant to fuel 32 leaks, and the membrane electrode assembly 16 of such fuel cells 10 are more robust, e.g. maintain their integrity longer. Referring now to FIG. 17, the membrane electrode assembly 16 including a silicone seal 34 is shown.

Figure 15:
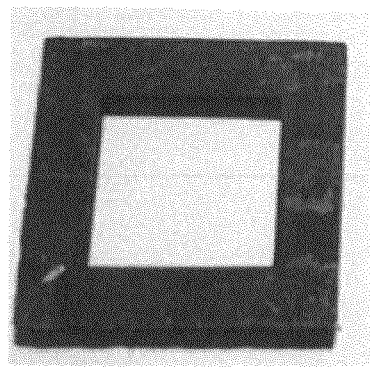
FIG. 15 is an isolated perspective view of a frame segment comprising acrylonitrile butadiene styrene (ABS).

Various non-limiting examples of suitable thermoplastics and thermoplastic elastomers include polyolefins, polyolefin elastomers, polyvinylchlorides (PVC), polyamides (PA), styrenic elastomers, thermoplastic vulcanate elastomer (TPV), fluoropolymers, silicones, polyesters, polyoxymethylenes (POM), thermoplastic polyurethanes (TPU), acrylonitrile butadiene styrene (ABS), and combinations thereof. In some preferred embodiments, the polymer is selected from thermoplastic polyurethane, polyoxymethylene, polyalkylene terephthalate, and combinations thereof. In a one embodiment, the polymer comprises, consists essentially of, or consists of ABS. For example, a frame 24 comprising ABS is shown in FIG. 15.

Suitable, non-limiting examples of polyolefins include polyethylene (PE), polypropylene (PP), polymethylpentene (PMP), and polybutene-1 (PB-1). Further suitable, non-limiting examples of polyolefin elastomers include polyisobutylene (PIB), ethylene propylene rubber (EPR), and ethylene propylene diene monomer rubber (EPDM).

Suitable, non-limiting examples of polyamides include PA11, PA12, PA610, PA612, PA1010, PA6, PA66, PA1110T, PA1212T, and combinations thereof.

Suitable, non-limiting examples of particular fluoropolymers include polytetrafluoroethylene (PTFE), fluorinated ethylene propylene (FEP), perfluoroalkoxy (PFA), and ethylenetetrafluoroethylene (ETFE).

In different embodiments, different fuels are used in the fuel cell 10 to generate electricity. Various fuels which can be utilized in the fuel cell 10 include, but are not limited to, hydrogen, methanol, hydrogen-rich methanol, ethanol, propanol, peroxide, gasoline, diesel fuel, and/or dimethyl ether. In some embodiments, the fuel 32 comprises known hydrogen and carbon rich liquids and gasses. In one embodiment, the fuel cell 10 is an ethanol fuel cell. That is, in one embodiment, the fuel cell 10 includes ethanol. In another embodiment, the fuel cell 10 is a water-hydrogen peroxide fuel cell. That is, in one embodiment, the fuel cells 10 include a mixture comprising water and hydrogen peroxide.

The fuel cell 10 comprises the anode 12 and the cathode 14. The anode 12 and the cathode 14 can be different or the same and can be of any construction known in the art. In a typical embodiment, the anode 12 and the cathode 14 comprise, consist essentially of, or consist of metalized fabrics or metalized polymer fibers, carbon cloth, carbon paper, and carbon felt. The anode 12 and the cathode 14 typically include a conducting support comprising sintered powder, foam, powder compacts, mesh (e.g. titanium or stainless steel), woven or non-woven materials, perforated sheets, assemblies of tubes, or the like. In many embodiments, electrocatalysts are deposited on the conducting support. The anode 12 and the cathode 14 may comprise the same electrocatalyst or a different electrocatalyst. Examples of suitable cathode electrocatalysts include platinum, alloys of platinum, platinum with additions of other elements, ruthenium, ruthenium/selenium, or perovskite and spinel catalyst structures. In a preferred embodiment, a platinum electrocatalyst is used.

As set forth above, the fuel cell 10 also comprises the membrane electrode assembly 16. The membrane electrode assembly 16 comprises a first polymeric proton exchange membrane 18 and a second polymeric proton exchange membrane 20. The first and second proton exchange membranes 18, 20 can be the same or different.

In a preferred embodiment, the first and second proton exchange membranes 18, 20 comprise, consist essentially of, or consist of an acidic electrolyte. Acidic electrolytes are very highly acidic materials which do not conduct electrons but are good conductors of protons. As such, protons generated at the anode 12, pass through the first and second proton exchange membranes 18, 20 to react with electrons at the cathode 14. Accordingly, these fuel cells 10 best operate at highly acidic pH where there is a plentiful supply of protons or hydrogen ions.

In many embodiments, the acid electrolyte comprises a proton exchange polymer. A proton exchange polymer allows passage of protons through first and second proton exchange membranes 18, 20, but resists the passage of anions and electrons through first and second proton exchange membranes 18, 20. Typically, a proton exchange polymer allows the passage of protons at least 10 times, alternatively at least 20 times, more readily than it permits the passage of similarly sized anions. Preferably a proton exchange polymer will permit the passage of protons at least 50, alternatively at least 100, times more readily than the passage of similarly sized anions.

The relative ease with which anions and protons are transmitted by a proton exchange polymer can be tested in a straightforward manner by, e.g. impedance spectroscopy as a function of temperature, using hot-pressed carbon paper/polymer/carbon paper samples completely immersed in deionized water.

The fuel cell 10 can include multiple proton exchange membranes which comprise the materials described herein with specific reference to the first and the second polymeric proton exchange membranes 18, 20. That is, the proton exchange polymers described herein can be used in the one or more proton exchange membranes 18, 20 employed in the fuel cells 10 described herein and contemplated herewith. That is, the fuel cell 10 may comprise one or more polymeric proton exchange membranes in addition to the first and second proton exchange membranes 18, 20.

In some embodiments, the first polymeric proton exchange membrane 18 and/or the second polymeric proton exchange membrane 20 comprise a fluorinated polymer. In a preferred embodiment, the proton exchange polymer is NAFION®, polysulphonic tetrafluoroethylene which is available through DuPont of Wilmington, Del. NAFION® comprises a tetrafluoroethylene backbone with side chains terminated with a sulphonic acid group. The sulphonic acid group is the active group of the ionomer, providing the mechanism for the conduction of protons to the cathode 14. In a preferred embodiment, the first polymeric proton exchange membrane 18 and/or the second polymeric proton exchange membrane 20 comprise polysulphonic tetrafluoroethylene.

In other embodiments, the first polymeric proton exchange membrane 18 and/or the second polymeric proton exchange membrane 20 comprise a polyaromatic polymer. Polyaromatic polymers such as polybenzimidazole can be used at higher temperatures and lower humidity levels than fluorinated polymers such as polysulphonic tetrafluoroethylene.

In still other embodiments, the first polymeric proton exchange membrane 18 and/or the second polymeric proton exchange membrane 20 comprise a water permeable polymer selected from the group of polyamide, polystyrene, polyvinyl chloride, and polyethylene terephthalate.

For example, in some embodiments, the first polymeric proton exchange membrane 18 and/or the second polymeric proton exchange membrane 20 comprise, consist essentially of, or consist of, a polyamide. The polyamide is typically selected from the group of polyamide 6 (polycaprolactam), polyamide 66 (polyhexamethyleneadipamide), polyamide 610 (polyhexamethylenesebacamide), copolyamide 6/66, and combinations thereof. In one particular embodiment, the polyamide comprises, consists essentially of, consists of, or is polyamide 6. In another particular embodiment, the polyamide is polyamide 6. In another particular embodiment, the polyamide comprises, consists essentially of, consists of, or is polyamide 66. In yet another particular embodiment, the polyamide comprises, consists essentially of, consists of, or is polyamide 6/66.

The first polymeric proton exchange membrane 18 and/or the second polymeric proton exchange membrane 20 are not limited to the polyamides described above. For example, polyamides which are obtainable via condensation of 1,4-diaminobutane with adipic acid at elevated temperature (polyamide 4,6) are suitable. As another example, polyamides which are obtainable via copolymerization of two or more of the abovementioned monomers, or a mixture of two or more polyamides, in any desired mixing ratio are suitable.

Specific suitable polyamides include, but are not limited to, polyamide 26 (ethylenediamine, adipic acid), polyamide 210 (ethylenediamine, sebacic acid), polyamide 46 (tetramethylenediamine, adipic acid), polyamide 66 (hexamethylenediamine, adipic acid), polyamide 69 (hexamethylenediamine, azelaic acid), polyamide 610 (hexamethylenediamine, sebacic acid), polyamide 612 (hexamethylenediamine, decanedicarboxylic acid), polyamide 613 (hexamethylenediamine, undecanedicarboxylic acid), polyamide 1212 (1,12-dodecanediamine, decanedicarboxylic acid), polyamide 1313 (1,13-diaminotridecane, undecanedicarboxylic acid), polyamide MXD6 (m-xylylenediamine, adipic acid), polyamide TMDT (trimethylhexamethylenediamine, terephthalic acid), polyamide 4 (pyrrolidone), polyamide 6 (epsilon-caprolactam), polyamide 7 (ethanolactam), polyamide 8 (capryllactam), polyamide 9 (9-aminononanoic acid), polyamide 11 (11-aminoundecanoic acid), polyamide 12 (laurolactam), and polyphenylenediamineterephthalamide (p-phenylenediamine, terephthalic acid).

The performance of the polymeric proton exchange membranes 18, 20 can be defined by its conductivity, permeability, and/or its thickness. In various embodiments, the fuel cell 10 includes one or more (e.g. a first and a second)

polymeric proton exchange membranes 18, 20 and/or the second polymeric proton exchange membrane 20 has a thickness of from about 10 to about 10,000, alternatively from about 10 to about 5,000, alternatively from about 10 to about 2,000, alternatively from about 10 to about 1,000, alternatively from about 10 to about 250, alternatively from about 15 to about 150, alternatively from about 20 to about 100, alternatively from about 100 to about 200, µm. In one embodiment, the one or more (e.g. a first and a second) polymeric proton exchange membranes 18, 20 have a thickness of about 25.4 µm. In another embodiment, the one or more (e.g. a first and a second) polymeric proton exchange membranes 18, 20 have a thickness of about 3.5 mil (88.9 µm). The thickness of the polymeric proton exchange membranes 18, 20 varies depending on the type of fuel 32 used in the fuel cell 10. The thickness of the polymeric proton exchange membranes 18, 20 and the acidic liquid electrolyte layer 22 (described below) effects ramp up of voltage and fluctuations in the current in the fuel cell 10. For example, a proton exchange membrane in a hydrogen fuel cell may have a thickness of from about 20 to about 100 µm, while a proton exchange membrane in an ethanol fuel cell may have a thickness of from about 100 to about 200 µm. Of course, thicknesses greater than 2,000 or even 5,000 µm are contemplated herein.

In some embodiments, the proton conductivity of the proton exchange membranes 18, 20 is preferably greater than about 60, alternatively greater than about 80, alternatively from about 80 to about 150, mS/cm$^2$. In various non-limiting embodiments, all values and ranges of values between the aforementioned values are hereby expressly contemplated.

In some embodiments, the water vapor permeability of the proton exchange membranes 18, 20 is greater than about 10, alternatively greater than about 30, alternatively greater than about 30, alternatively greater than about 40, alternatively greater than about 50, alternatively greater than about 60, alternatively greater than about 80, alternatively greater than about 90, alternatively greater than about 100, alternatively greater than about 110, alternatively greater than about 120, alternatively greater than about 130, alternatively greater than about 140, alternatively greater than about 150, alternatively from about 10 to about 250, alternatively from about 50 to about 250, alternatively from about 100 to about 250, alternatively from about 150 to about 250, g µm·day·m$^2$. Water vapor permeability can be tested in accordance with (1) ASTM F1249-06 Standard Test Method for Water Vapor Transmission Rate Through Plastic Film and Sheeting Using a Modulated Infrared Sensor; or (2) ASTM E398-03 Standard Test Method for Water Vapor Transmission Rate of Sheet Materials Using Dynamic Relative Humidity Measurement.

In some embodiments, the first and second polymeric proton exchange membranes 18, 20 are not separated by the frame 24. For example, in some embodiments, the membrane electrode assembly 16 comprises: the first polymeric proton exchange membrane 18 defining an outer face and an inner face 82 wherein the inner face 82 has two or more continuous first inner face projections 84 disposed about a perimeter of the inner face 82; and the second polymeric proton exchange membrane 20 defining an outer face 86 and an inner face 88 wherein the inner face 88 has two or more continuous second inner face projections 90 disposed about a perimeter of the inner face 88. The two or more continuous first inner face projections 84 or the two or more continuous second inner face projections 90 form one or more channels 92, and wherein the two or more continuous first inner face projections 84 and the two or more second inner face projections 90 fill in the one or more channels 92 to operatively connect the first and second polymeric exchange membranes 18, 20, and form a cavity for the acidic liquid electrolyte layer 22 which is disposed between the first and second proton exchange membranes 18, 20.

In many embodiments, the width of the channels 92 is greater than the width of the projections 84, 90. In some such embodiments, a ratio of the width of the projections 84, 90 to the width of the channels 92 is from about 1:1.25 to about 1:3. Of course, the width of each projection 84, 90 can be the same or different, and the width of each channel 92 can be the same or different. The depth of the channel(s) 92, and the height of the projections 84, 90 may vary as well.

Figure 18:
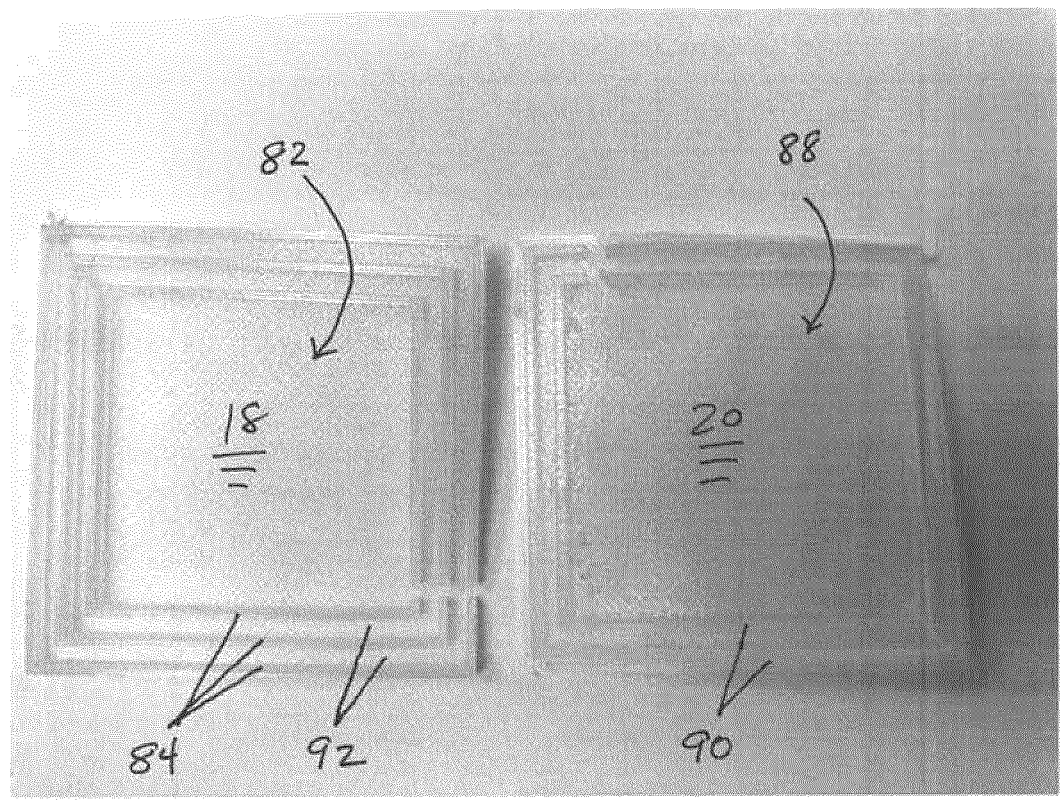
FIG. 18 is an image of a first polymeric proton exchange membrane having three continuous first inner face projections which form two channels, and a second polymeric proton exchange membrane having two continuous second inner face projections which fill the two channels.
Figure 19:
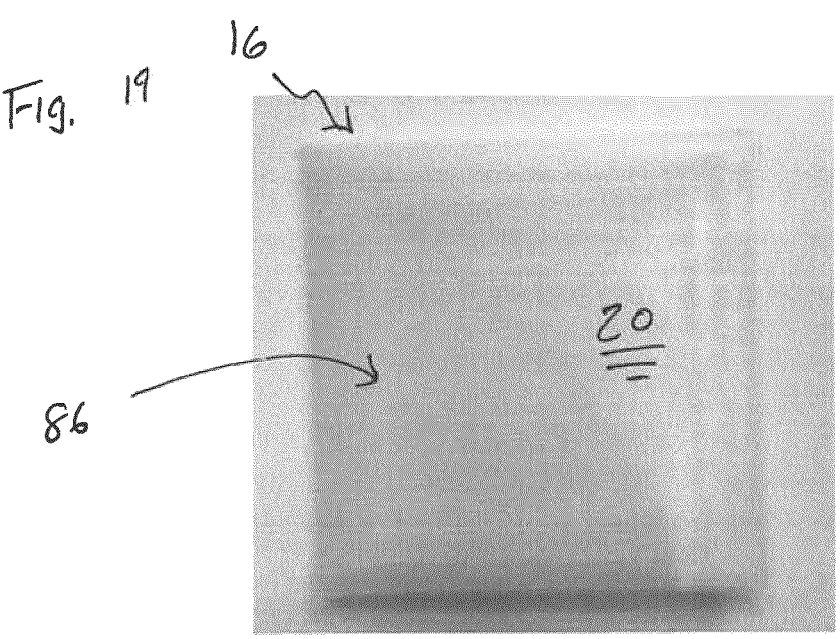
FIG. 19 shows the first and second polymeric proton exchange membranes of FIG. 18 operably connected to form a cavity for the acidic liquid electrolyte layer which is disposed therebetween.

For example, in the embodiment of FIGS. 18 and 19, the membrane electrode assembly 16 comprises the first polymeric proton exchange membrane 18 having three continuous first inner face projections 84 and which form two channels 92, and the second polymeric proton exchange membrane 20 having two continuous second inner face projections 90 which fill the two channels 92. FIG. 18 shows the first polymeric proton exchange membrane 18 having three continuous first inner face projections 84 and which form two channels, and also the second polymeric proton exchange membrane 20 having two continuous second inner face projections 90 which fill the two channels 92. FIG. 19 shows the first and second polymeric proton exchange membranes 18, 20 of FIG. 18 operably connected to form a cavity for the acidic liquid electrolyte layer 22 which is disposed therebetween.

In some embodiments, the two or more continuous first inner face projections 84 and/or the two or more continuous second inner face projections 90 are formed from the same material as the respective polymeric proton exchange membranes 18, 20. For example, in some embodiments, the first polymeric proton exchange membrane 18 and the second polymeric proton exchange membrane 20 having the projections 84, 90 thereon comprise a fluorinated polymer such as polysulphonic tetrafluoroethylene. As another example, in some embodiments, the first polymeric proton exchange membrane 18 and the second polymeric proton exchange membrane 20 having the projections 84, 90 thereon comprise a water permeable polymer selected from the group of polyamide.

In other embodiments, the two or more continuous first inner face projections 84 and/or the two or more continuous second inner face projections 90 are formed from a material which is different than the respective polymeric proton exchange membranes 18, 20.

In a typical embodiment, the projections 84, 90 are bonded together via an adhesive which is applied in said one or more channels 92. In some embodiments, the adhesive is selected from an epoxy adhesive, a cyanoacrylate adhesive, a urethane adhesive, an acrylic adhesive, a butyl adhesive, a latex adhesive, a polysulfide adhesive, a silicone adhesive, or a combination thereof. In a preferred embodiment, the projections 84, 90 are bonded together via a silicone adhesive.

The acidic liquid electrolyte layer 22, which is disposed between the first and second proton exchange membranes 18, 20, comprises an acidic liquid electrolyte. The acidic liquid electrolyte may be any conventional acidic liquid electrolyte. The acidic liquid electrolyte may be a liquid or also a gel. That is, acidic liquid electrolytes in gel form are contemplated herein. For example, the acidic liquid electrolyte may be in a liquid form, e.g. a cation conducting liquid, such as phosphoric acid or in gel form, e.g. NAVEL JELLY® which is commercially available through Henkel Corporation. In a preferred embodiment, the acidic liquid electrolyte comprises, consists essentially of, or consists of, phosphoric acid.

In contrast to first and second proton exchange membranes 18, 20, the acidic liquid electrolyte layer 22 acts as the electrolyte conducting protons from the anode 12 to the cathode 14. Traditionally, in a phosphoric acid fuel cell, the acidic liquid electrolyte operates at higher temperatures relative to a polymeric proton exchange membrane fuel cell which utilizes the proton exchange polymers described above. The acidic liquid electrolyte layer 22 includes any suitable liquid electrolyte enabling the half reactions at each electrode to produce useful work and is not limited to phosphoric acid.

In many embodiments, the acidic liquid electrolyte layer 22 comprises, consists essentially of, or consists of the acidic liquid electrolyte. However, the acidic liquid electrolyte of the acidic liquid electrolyte layer 22 may be contained within a matrix comprising silicon carbide, asbestos, sol-gels, polybenzimidazole, and other porous structures.

The performance of the acidic liquid electrolyte layer 22 is defined by its thickness. In various embodiments, the fuel cell 10 includes one or more (e.g. a first and a second) of the acidic liquid electrolyte layer 22. In various embodiments, the acidic liquid electrolyte layer 22 has a thickness of from about 0.1 to about 10, alternatively from about 0.1 to about 8, alternatively from about 0.1 to about 6, alternatively from about 0.1 to about 5, alternatively from about 0.1 to about 4, alternatively from about 0.1 to about 2, mm. In various non-limiting embodiments, all values and ranges of values between the aforementioned values are hereby expressly contemplated. The thickness of the acidic liquid electrolyte layer 22 varies depending on the type of fuel used in the fuel cell 10.

The utilization of one or more additional acidic liquid electrolyte layers 22 is contemplated herein. For example, the membrane electrode assembly 16 could comprise the first polymeric proton exchange membrane 18, the acidic liquid electrolyte layer 22 (in this case the first acidic liquid electrolyte layer) adjacent to the first polymeric proton exchange membrane 18, the second polymeric proton exchange membrane 20 adjacent to the first acidic liquid electrolyte layer 22, and a second acidic liquid electrolyte layer adjacent to the second polymeric proton exchange membrane 20, and a third polymeric proton exchange membrane adjacent to the second acidic liquid electrolyte layer.

In many embodiments, the fuel cell 10 includes a weight ratio between (1) a total amount of proton exchange polymer (i.e. the sum of the weight of the polymeric proton exchange membranes included in the cell) and (2) the total weight of acidic liquid electrolyte of from about 10:1 to about 1:1,500, alternatively from about 1:100 to about 1:1,000, alternatively from about 1:550 to about 1:600. In various non-limiting embodiments, all values and ranges of values between the aforementioned ratios are hereby expressly contemplated.

In many embodiments, the fuel cell 10 comprises a first flow-field plate adjacent to the first outer layer and a second flow-field plate adjacent to the second outer layer. In some embodiments, the first and second flow-field plates comprise nickel plated copper. In other embodiments, the first and second flow-field plates comprise stainless steel.

The fuel cell 10 typically contains the oxidant 28. In many typical embodiments, the oxidant 28 is selected from oxygen, air, or other oxygen-containing gases, but could also comprise liquid redox agents.

The fuel cell 10 disclosed herein typically includes additional components of fuel cells known in the art, such as a fuel supply means, an air or oxygen supply means, electrical outlets, flow-field plates or the like, a fuel or air/oxygen pump, and so on. Of course, methods of constructing fuel cells are known to those skilled in the art.

A fuel cell stack is also disclosed herein. The fuel cell stack may comprise a plurality of the fuel cell 10, i.e., one or more of the fuel cell 10. In the fuel cell stack of the invention, the fuel cells 10 may be electrically connected in series, or in parallel, or in a combination of both series and parallel connections and the plurality of fuel cells 10 can be housed in any suitable stack architecture where useful electrical energy can be produced.

A method of producing electricity with the fuel cell 10 is also disclosed. The method of generating electricity comprises the step of supplying a fuel 32 and the oxidant 28 to the fuel cell 10 or the fuel cell stack, to cause the oxidation of the fuel 32 and generate free electrons at the anode 12 and produce electricity. In one embodiment, the method comprises the step of providing hydrogen, methanol, and/or ethanol to the fuel cell 10 and producing electricity. In many embodiments, the method is conducted at a temperature of from about −20 to about 200, alternatively from about −20 to about 150, alternatively from about −20 to about 100, alternatively from about 0 to about 150, alternatively from about 1 to about 100, alternatively from about 25 to about 75, ° C. In various non-limiting embodiments, all values and ranges of values between the aforementioned values are hereby expressly contemplated.

The following examples are intended to illustrate the present invention and are not to be viewed in any way as limiting to the scope of the present invention.

EXAMPLES

Figure 2:
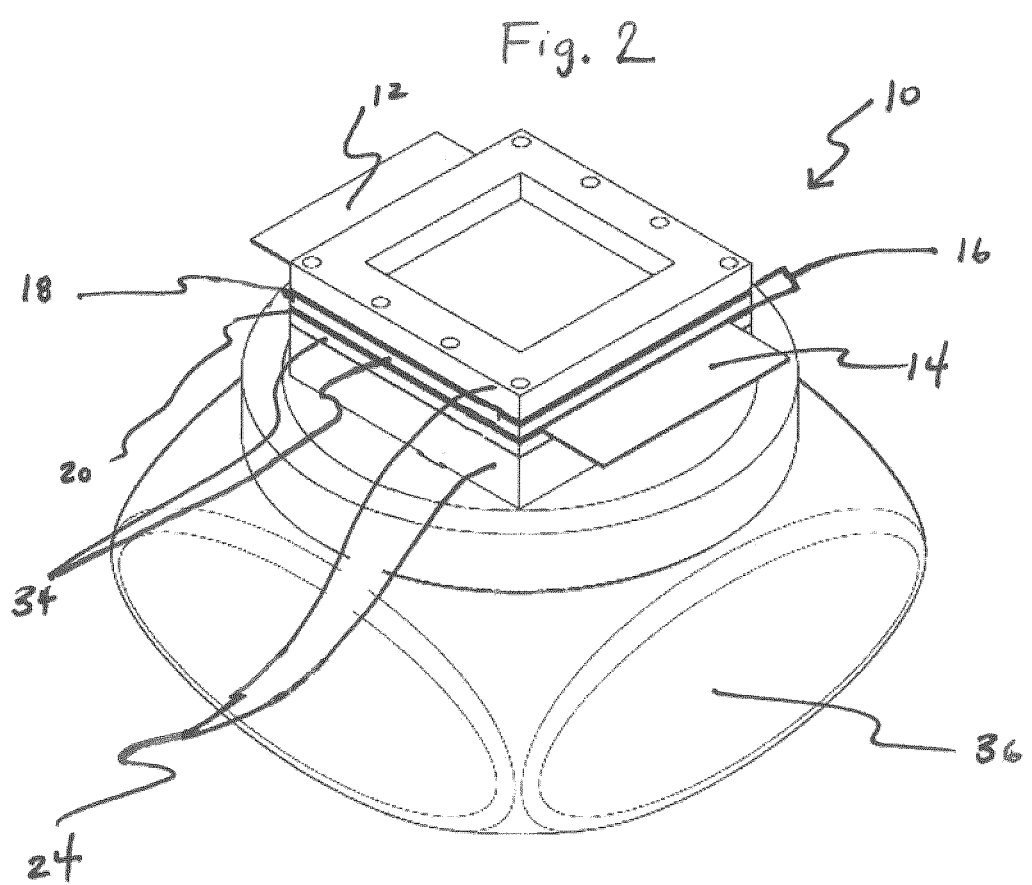
FIG. 2 is a perspective view of a fuel cell according to this invention.
Figure 3:
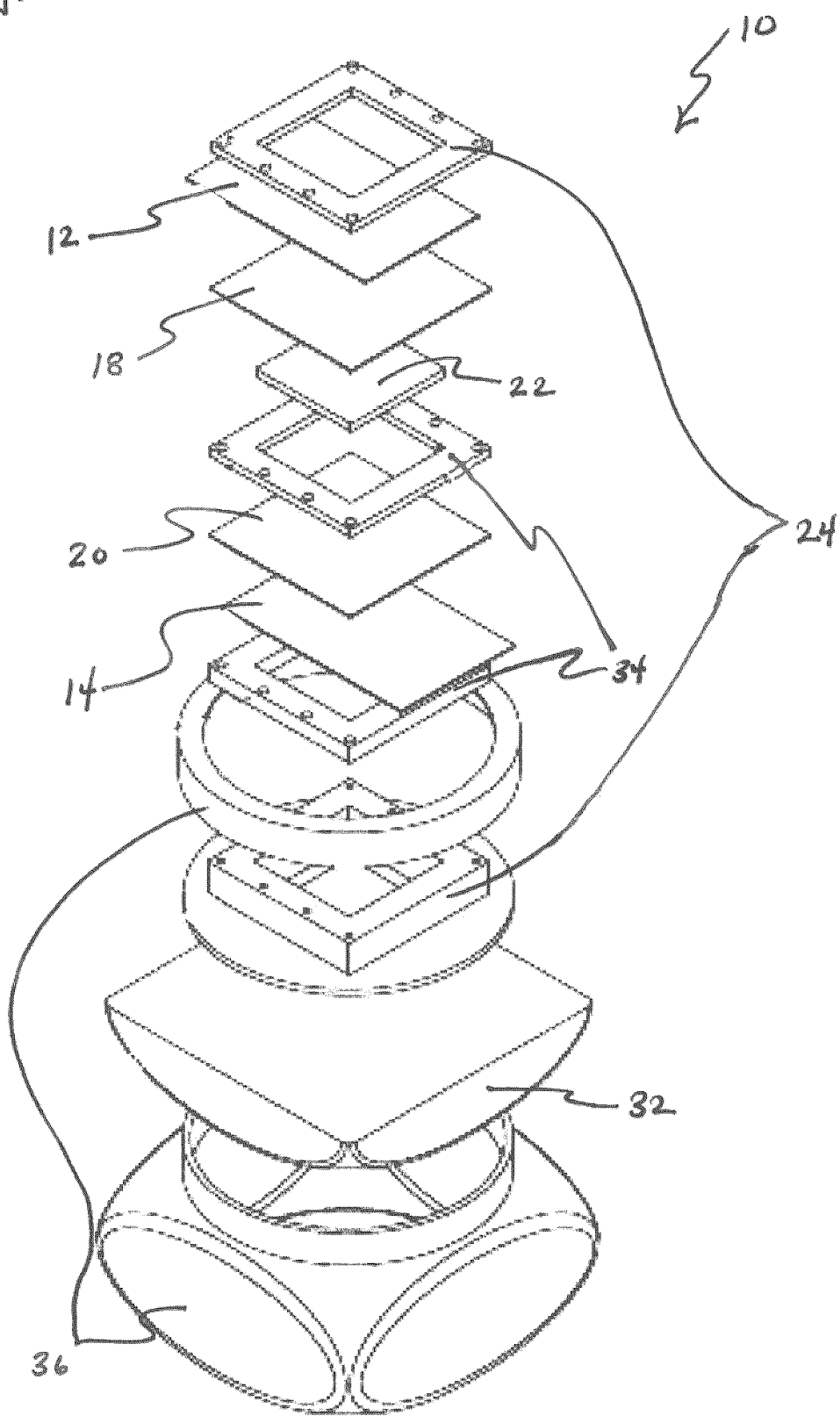
FIG. 3 is a cross-sectional view of the fuel cell of FIG. 2.
Figure 4:
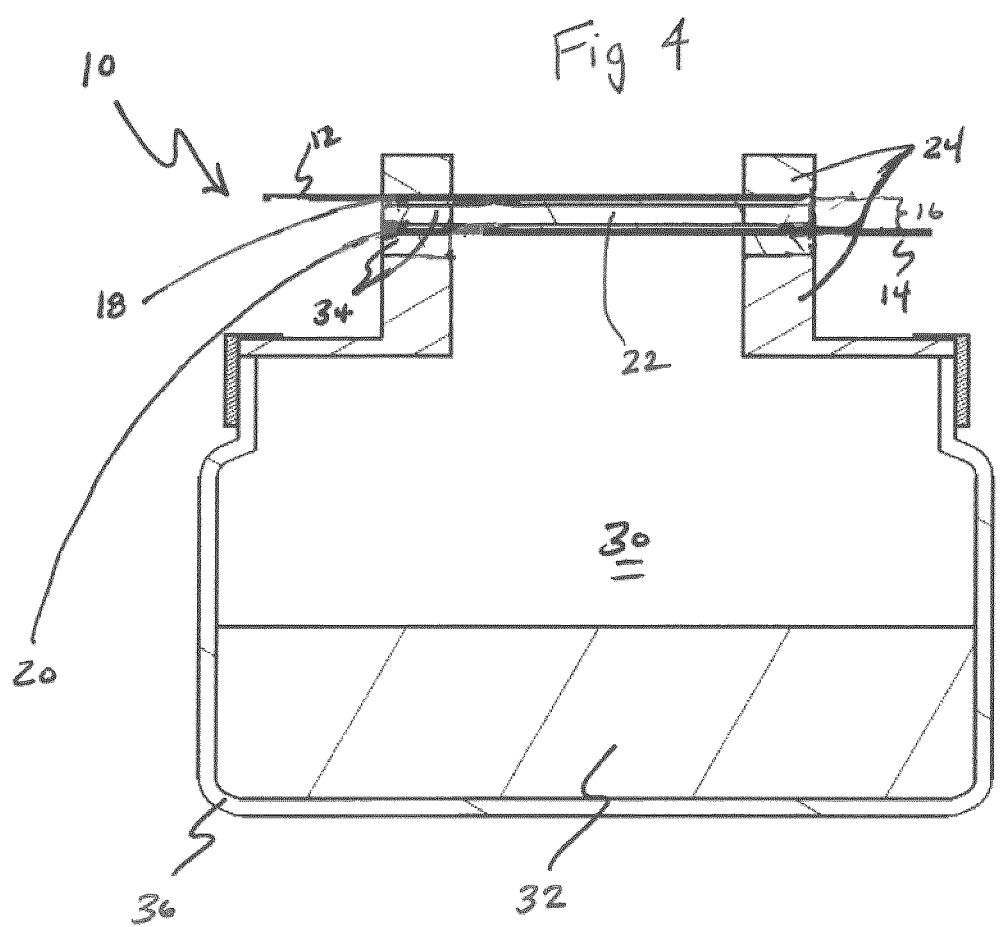
FIG. 4 is an exploded cross-sectional view of the fuel cell of FIG. 2.

Example Fuel Cell 1 is shown in FIGS. 2-4 and is formed in accordance with the subject disclosure. Example Fuel Cell 1 includes first and second polymeric proton exchange membranes having a thickness of about 88.9 μm, an area of about 12.25 cm$^2$, and comprising sulfonated tetrafluoroethylene based fluoropolymer-copolymer sold by DuPont under the trade name NAFION® NE1035. The acidic liquid electrolyte layer comprises 3.125 cm$^3$ (1.5 grams) of phosphoric acid. Example Fuel Cell 1 utilizes 50 cm$^3$ of fuel.

Figure 8:
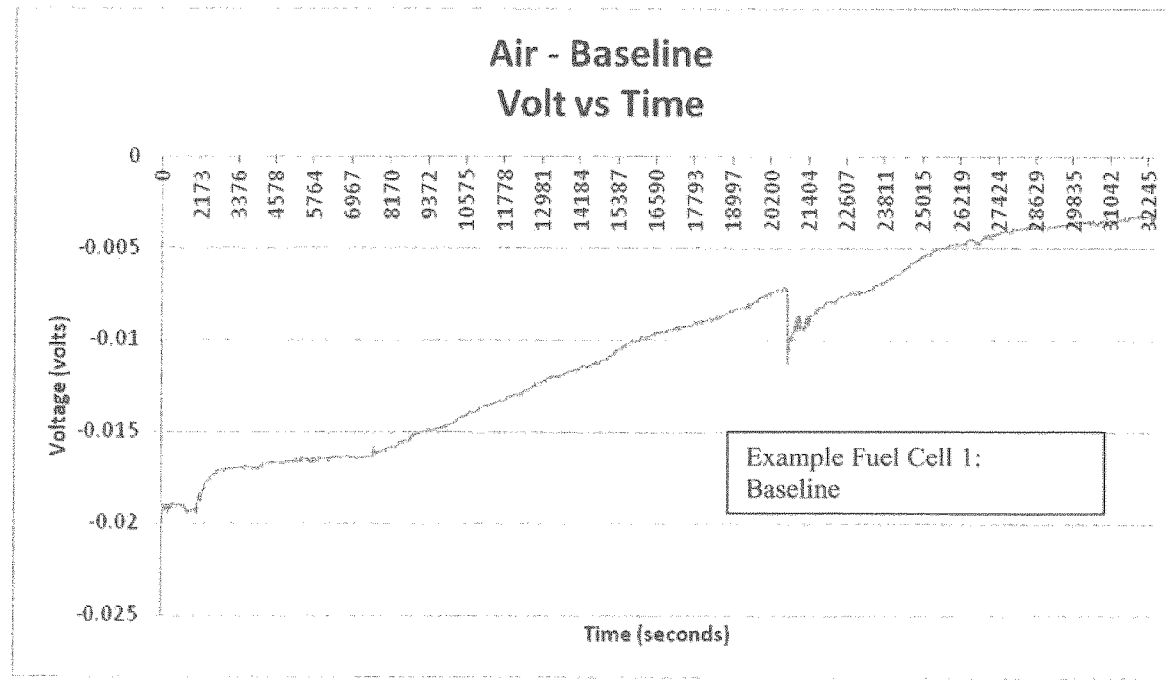
FIG. 8 is a baseline graph of voltage vs. time for Example Fuel Cell 1.

Example Fuel Cell 1 causes the oxidation of the fuel and generates free electrons at the anode to produce electricity. A baseline output for the fuel cell of Example Fuel Cell 1 is shown in FIG. 8. The baseline output is used to show that Example Fuel Cell 1 does not have an induced voltage potential and Example Fuel Cell 1 will, in time, go to zero voltage. The fuel as a liquid or vapor combined with an oxidant across the cell generates the electric potential between an anode and a cathode.

Figure 9:
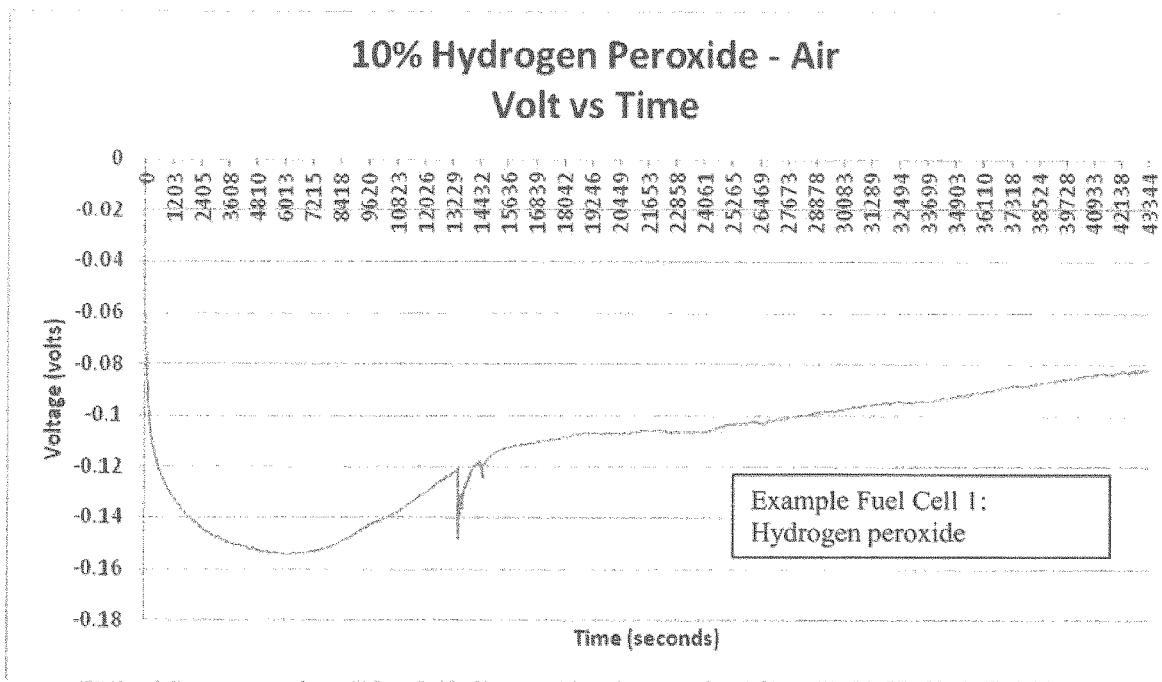
FIG. 9 is a graph of voltage vs. time for Example Fuel Cell 1 with hydrogen peroxide as fuel.
Figure 10:
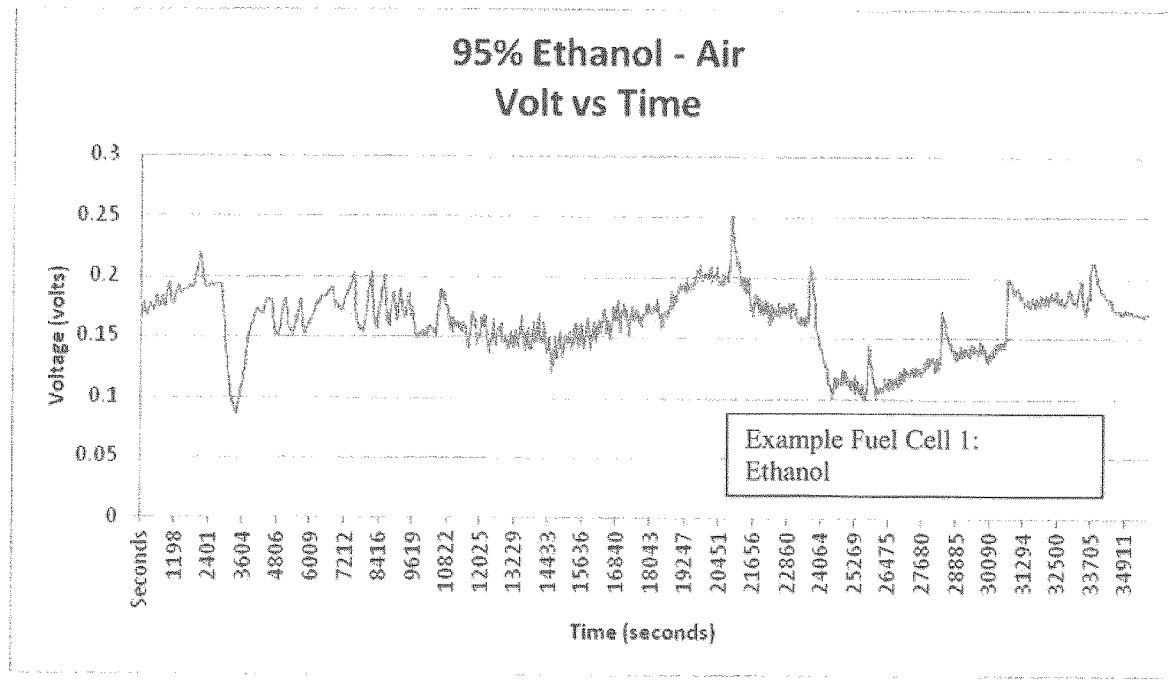
FIG. 10 is a graph of voltage vs. time for Example Fuel Cell 1 with ethanol as fuel.
Figure 11:
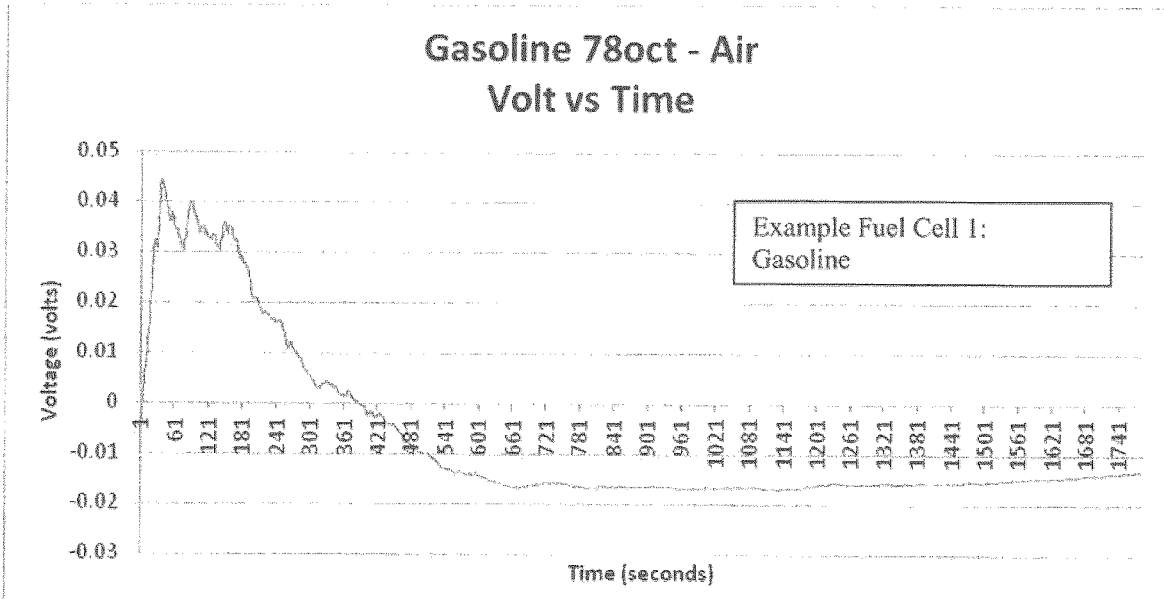
FIG. 11 is a graph of voltage vs. time for Example Fuel Cell 1 with gasoline as fuel.

FIG. 9 is a graph which plots voltage vs. time for Example Fuel Cell 1 with hydrogen peroxide vapor as fuel. FIG. 10 is a graph which plots voltage vs. time for Example Fuel Cell 1 with ethanol vapor as fuel. FIG. 11 is a graph which plots voltage vs. time for Example Fuel Cell 1 with gasoline vapor as fuel. FIGS. 9 through 11 demonstrate that a variety of different fuels can be used to achieve steady state voltage potential across the anode and the cathode of Example Fuel Cell 1. The size of the first polymeric proton exchange membrane, the second polymeric proton exchange membrane, and the thickness of the acidic liquid electrolyte layer can be changed for each fuel. In FIG. 10, 95% ethanol vapor demonstrates a high rate of vaporization at room temperature which generates a mean 0.15V voltage potential. Further experimentation regarding the thickness of the first and second polymeric proton exchange membranes and thickness of the acidic liquid electrolyte layer at different vaporization temperatures can be used to achieve better results for different fuels.

Figure 5:
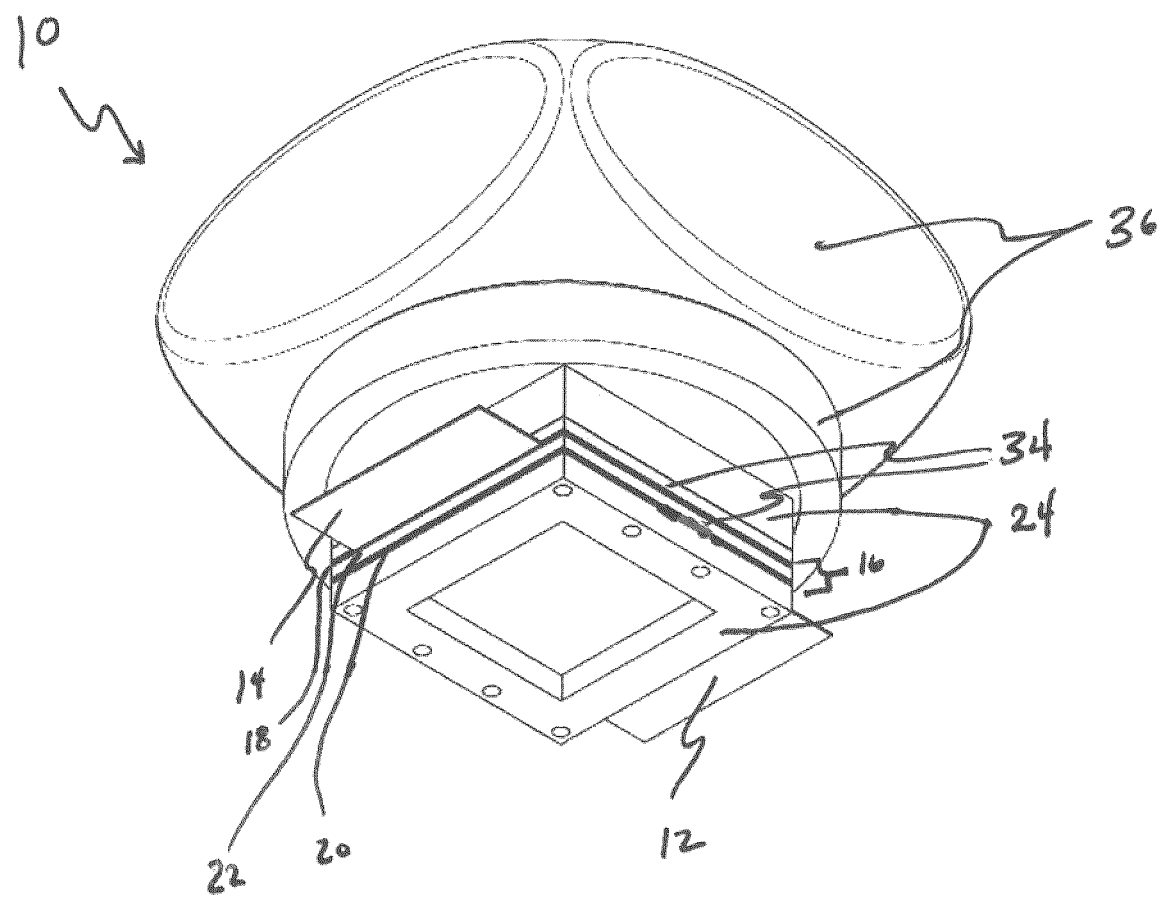
FIG. 5 is a perspective view of a fuel cell according to this invention.
Figure 6:
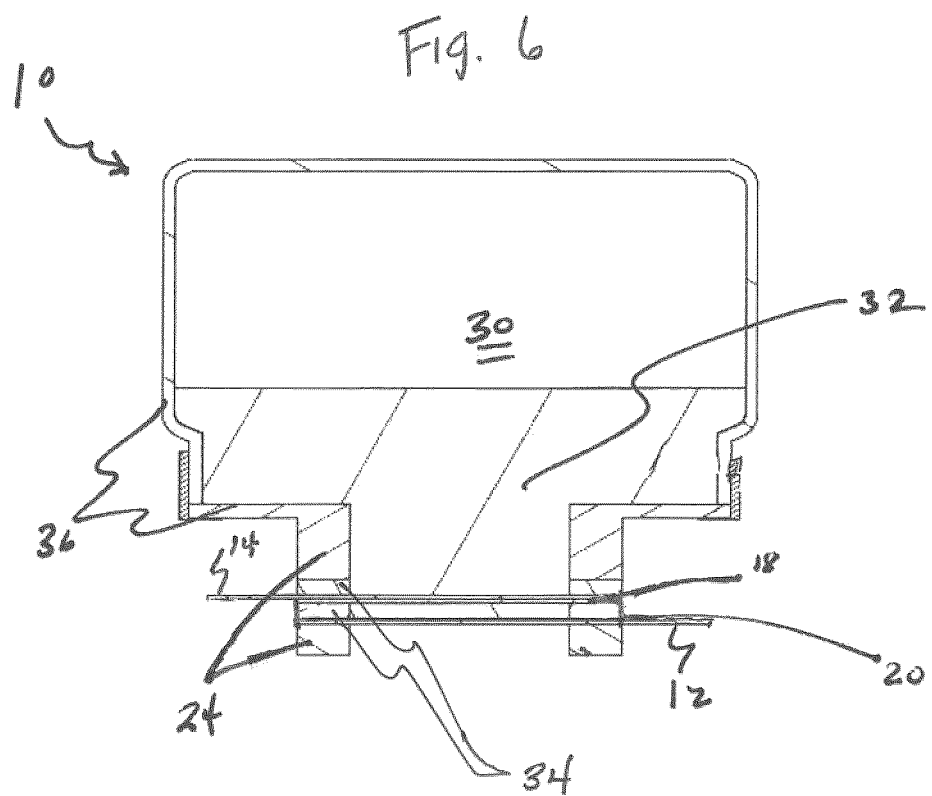
FIG. 6 is a cross-sectional view of the fuel cell of FIG. 5.
Figure 7:
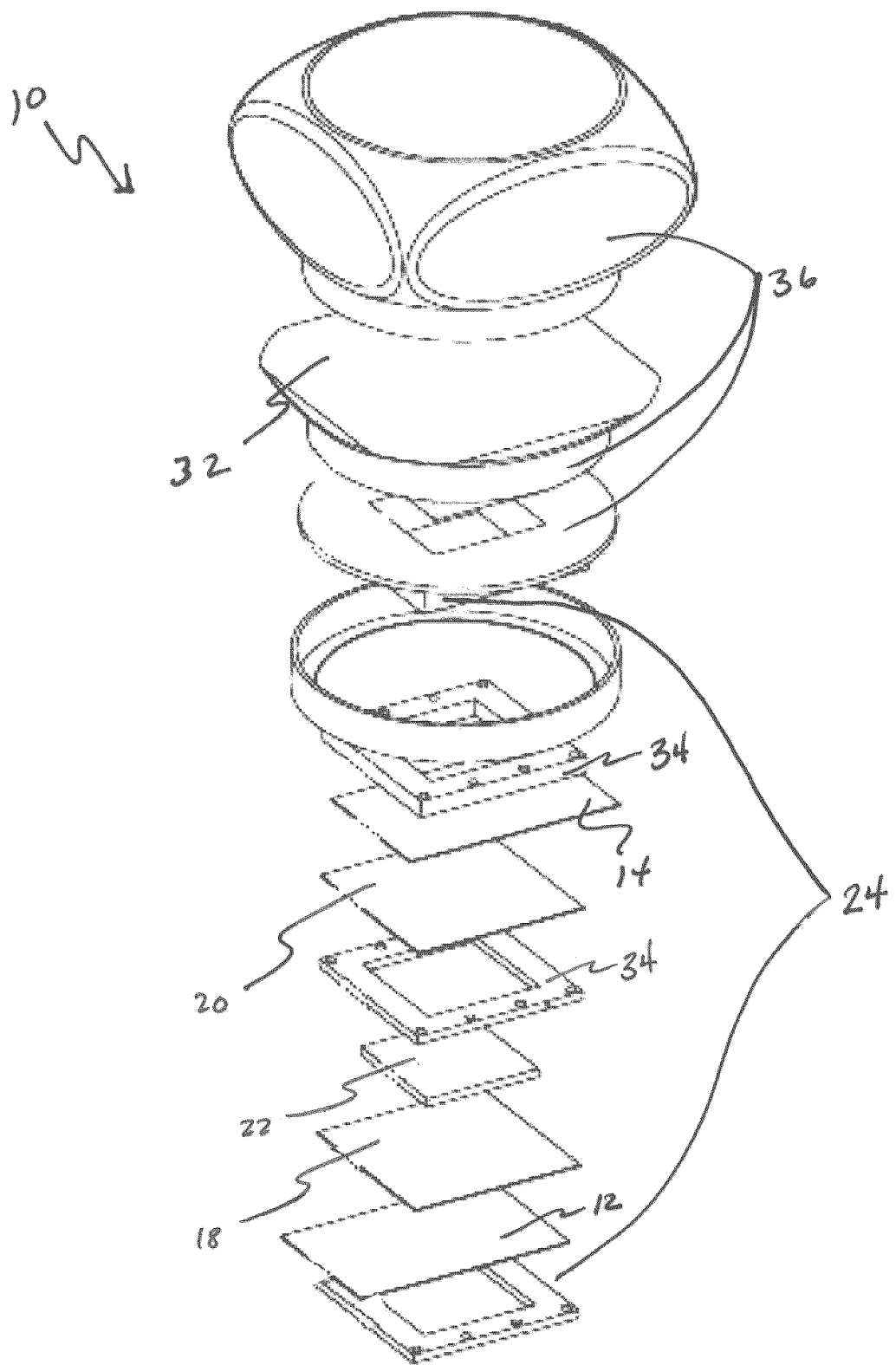
FIG. 7 is an exploded cross-sectional view of the fuel cell of FIG. 5.
Figure 14:
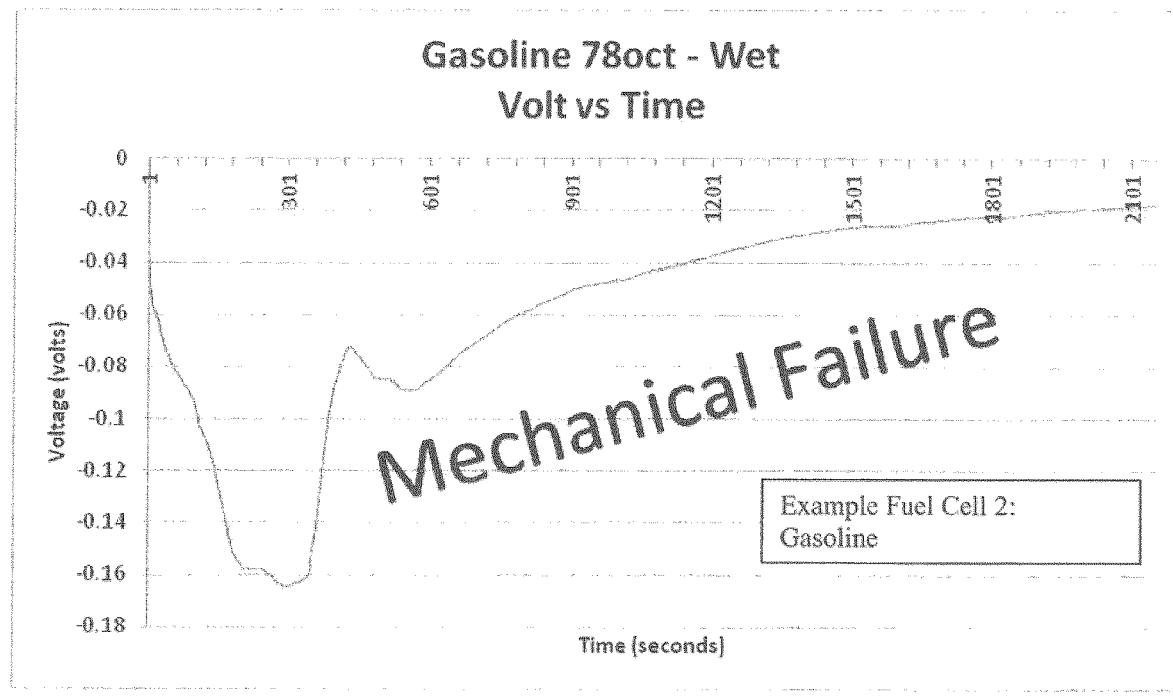
FIG. 14 is a graph of voltage vs. time for Example Fuel Cell 2 with gasoline as fuel.

Example Fuel Cell 2 is shown in FIGS. 5-7 and is formed in accordance with the subject disclosure. Example Fuel Cell 2 includes first and second polymeric proton exchange membranes having a thickness of about 88.9 µm, an area of about 12.25 cm$^2$, and comprising sulfonated tetrafluoroethylene based fluoropolymer-copolymer sold by DuPont under the trade name NAFION® NE1035. The acidic liquid electrolyte layer comprises 3.125 cm$^3$ (1.5 grams) of phosphoric acid. Example Fuel Cell 2 utilizes 50 cm$^3$ of fuel. Example Fuel Cell 2 demonstrates direct fuel contact with the cell to generate a higher voltage potential and resistance to direct CO poisoning. Fuels like 10% hydrogen peroxide and gasoline that have a higher vaporization temperature achieve higher voltage potential across the cell at room temperatures of 20° C. Mechanical failure occurs as shown in FIG. 14 because the frame is incompatible with gasoline (e.g. 78 octane).

Figure 12:
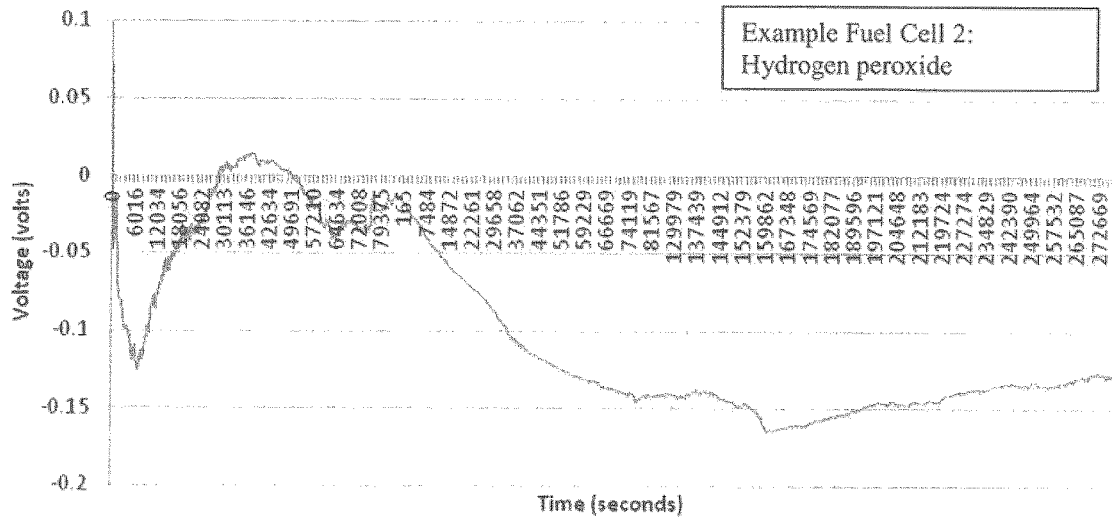
FIG. 12 is a graph of voltage vs. time for Example Fuel Cell 2 with hydrogen peroxide as fuel.
Figure 13:
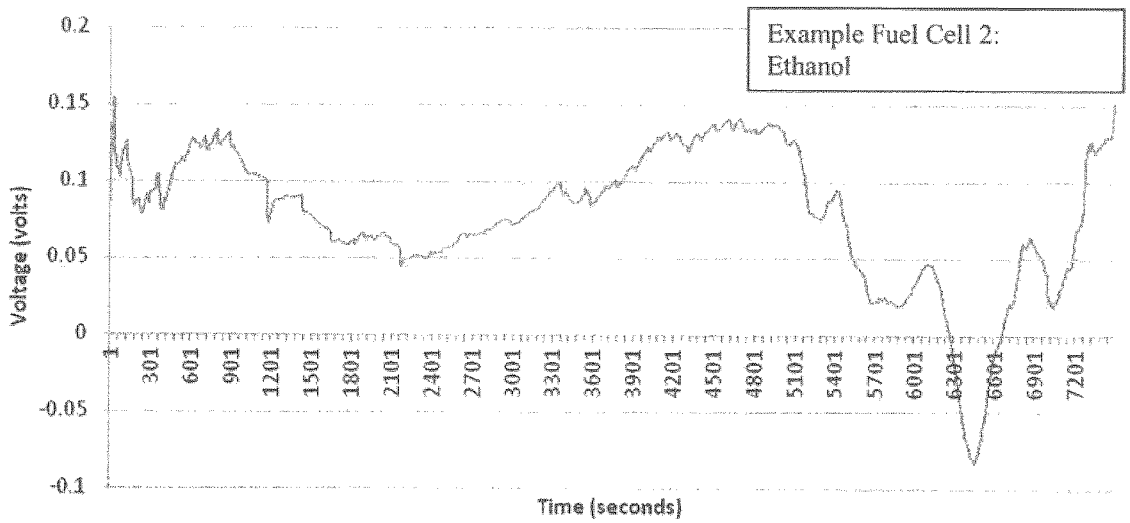
FIG. 13 is a graph of voltage vs. time for Example Fuel Cell 2 with ethanol as fuel.

FIG. 12 is a graph which plots voltage vs. time for Example Fuel Cell 2 with hydrogen peroxide as fuel. FIG. 13 is a graph which plots voltage vs. time for Example Fuel Cell 2 with ethanol as fuel. FIG. 14 is a graph which plots voltage vs. time for Example Fuel Cell 2 with gasoline as fuel; use of gasoline corrodes the frame, but the first and second polymeric proton exchange membranes remains intact. The cell with frame materials compatible with gasoline would result in a successful Example Fuel Cell 2. Further experimentation regarding the thickness of the first and second polymeric proton exchange membranes and thickness of the acidic liquid electrolyte layer at different vaporization temperatures can be used to achieve better results for different fuels.

It is also to be understood that any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The present invention has been described in an illustrative manner, and it is to be understood that the terminology which has been used is intended to be in the nature of words of description rather than of limitation. Obviously, many modifications and variations of the present invention are possible in light of the above teachings. It is, therefore, to be understood that within the scope of the appended claims, the present invention may be practiced otherwise than as specifically described.

What is claimed is:

1. A hybrid fuel cell comprising:
   an anode;
   a cathode; and
   a membrane electrode assembly comprising:
      a first polymeric proton exchange membrane;
      a second polymeric proton exchange membrane; and
      an acidic liquid electrolyte layer disposed between said first and second proton exchange membranes,
         wherein said acidic liquid electrolyte layer consists essentially of the acidic liquid electrolyte.

2. A fuel cell as set forth in claim 1 wherein said first polymeric proton exchange membrane and/or said second polymeric proton exchange membrane comprises a water permeable polymer selected from the group of polyamide, polystyrene, polyvinyl chloride, ethylene-vinyl alcohol, and polyethylene terephthalate.

3. A fuel cell as set forth in claim 1 wherein said first polymeric proton exchange membrane and/or said second polymeric proton exchange membrane comprises a polyamide selected from the group of polycaprolactam, polyhexamethyleneadipamide, polyhexamethylenesebacamide, and combinations thereof.

4. A fuel cell as set forth in claim 1 wherein said first polymeric proton exchange membrane and/or said second polymeric proton exchange membrane comprises polyamide 6.

5. A fuel cell as set forth in claim 2 wherein said water permeable polymer has a water vapor permeability of greater than 20 g 25 µm*day*m^2.

6. A fuel cell as set forth in claim 1 wherein said first polymeric proton exchange membrane and/or said second polymeric proton exchange membrane comprises a fluorinated polymer.

7. A fuel cell as set forth in claim 1 wherein said first polymeric proton exchange membrane and/or said second polymeric proton exchange membrane comprises polysulphonic tetrafluoroethylene.

8. A fuel cell as set forth in claim 1 wherein said first polymeric proton exchange membrane and/or said second polymeric proton exchange membrane comprises a polyaromatic polymer.

9. A fuel cell as set forth in claim 1 wherein said acidic liquid electrolyte is phosphoric acid.

10. A fuel cell as set forth in claim 1, wherein said membrane electrode assembly comprises:
    a first polymeric proton exchange membrane defining an outer face and an inner face wherein said inner face has two or more continuous first inner face projections disposed about a perimeter of the inner face; and a second polymeric proton exchange membrane defining an outer face and an inner face wherein said inner face has two or more continuous second inner face projections disposed about a perimeter of the inner face;

wherein said two or more continuous first inner face projections or said two or more continuous second inner face projections form one or more channels, and wherein said two or more continuous first inner face projections and said two or more second inner face projections fill in said one or more channels to operatively connect said first and second polymeric exchange membranes and form a cavity for said acidic liquid electrolyte layer disposed between said first and second polymeric proton exchange membranes.

11. A fuel cell as set forth in claim 1 wherein said acidic liquid electrolyte layer has a thickness of from about 0.1 μm to about 10 mm.

12. A fuel cell as set forth in claim 1 wherein said membrane electrode assembly comprises said first and second polymeric proton exchange membranes and said acidic liquid electrolyte in a weight ratio of from about 1:100 to about 1:1,000 (total weight of said first and second polymeric proton exchange membranes:total weight of said acidic liquid electrolyte).

13. A fuel cell as set forth in claim 1 comprising hydrogen, methanol, ethanol, propanol, hydrogen peroxide, gasoline, and/or dimethyl ether.

14. A fuel cell as set forth in claim 1 comprising a peroxide comprising mixture.

15. A fuel cell as set forth in claim 1 further comprising a first flow-field plate adjacent to said first polymeric proton exchange membrane and a second flow-field plate adjacent to said second polymeric proton exchange membrane.

16. A fuel cell as set forth in claim 1 comprising one or more additional polymeric proton exchange membranes.

17. A fuel cell as set forth in claim 1 comprising one or more additional acidic liquid electrolyte layers.

18. A fuel cell as set forth in claim 1 further comprising an electrocatalyst.

19. A fuel cell as set forth in claim 1 free of an electrocatalyst.

20. A method of using a fuel cell as set forth in claim 1, said method comprising the step of providing hydrogen, methanol, hydrogen peroxide, and/or ethanol to the fuel cell and producing electricity.

* * * * *